United States Patent Office

3,392,110
Patented July 9, 1968

3,392,110
METHOD FOR THE UTILIZATION OF HIGHLY ACTIVE HYDROCARBON CONVERSION CATALYSTS
John W. Payne, Woodbury, N.J., assignor to Mobil Oil Corporation, a corporation of New York
Filed Sept. 2, 1965, Ser. No. 484,523
7 Claims. (Cl. 208—120)

This invention relates to the conversion of hydrocarbons, in such operations as cracking, hydrocracking, isomerization, dehydrogenation, aromatization, and the like. In a specific aspect, it is concerned with the conversion of gas oils into gasoline. In all aspects, it is concerned with conducting such conversions in the presence of newly discovered highly active catalysts.

There has been discovered recently a group of very highly active catalytic materials, which have activities for many of the conversions mentioned, and particularly for cracking, which are far beyond the capabilities of presently conventional catalysts such as the amorphous compositions of silica and alumina now in widespread use. Not only are these materials more active, but their product distribution, that is, the relative amounts of various products of conversion are different. This invention is directed to the more efficient utilization of these catalysts.

A major object of this invention is to provide a process wherein two or more catalytic materials may be used simultaneously, and yet the character of the operation may be controlled to emphasize the effects of one catalyst and de-emphasize the effects of the other catalytic ingredients.

A major object of this invention is the provision of a method whereby a highly active cracking catalyst can be brought into contact with hydrocarbon reactant for a controlled, critically short time period.

A major object of this invention is to provide a process wherein the effect of the catalyst and the necessity of providing heat to a reactor may be effected by separate agencies.

An object of this invention is to provide an improved regeneration process wherein a highly active conversion catalyst, contaminated by a hydrocarbon conversion process, can be regenerated by burning in a manner so controlled as to time, temperature, and degree of regeneration as to return the catalyst to conversion at an optimum activity.

An object of this invention is to provide a unitary combination of a conversion reaction of the kind described above and of the regeneration mentioned.

These and other objects of the invention will be shown in detail in the following discussion. While major objects of this invention are not limited to a specific apparatus, such an apparatus, and its method of operation, which are exemplary, will be discussed, based upon the two figures of drawings attached hereto.

Figure 1:
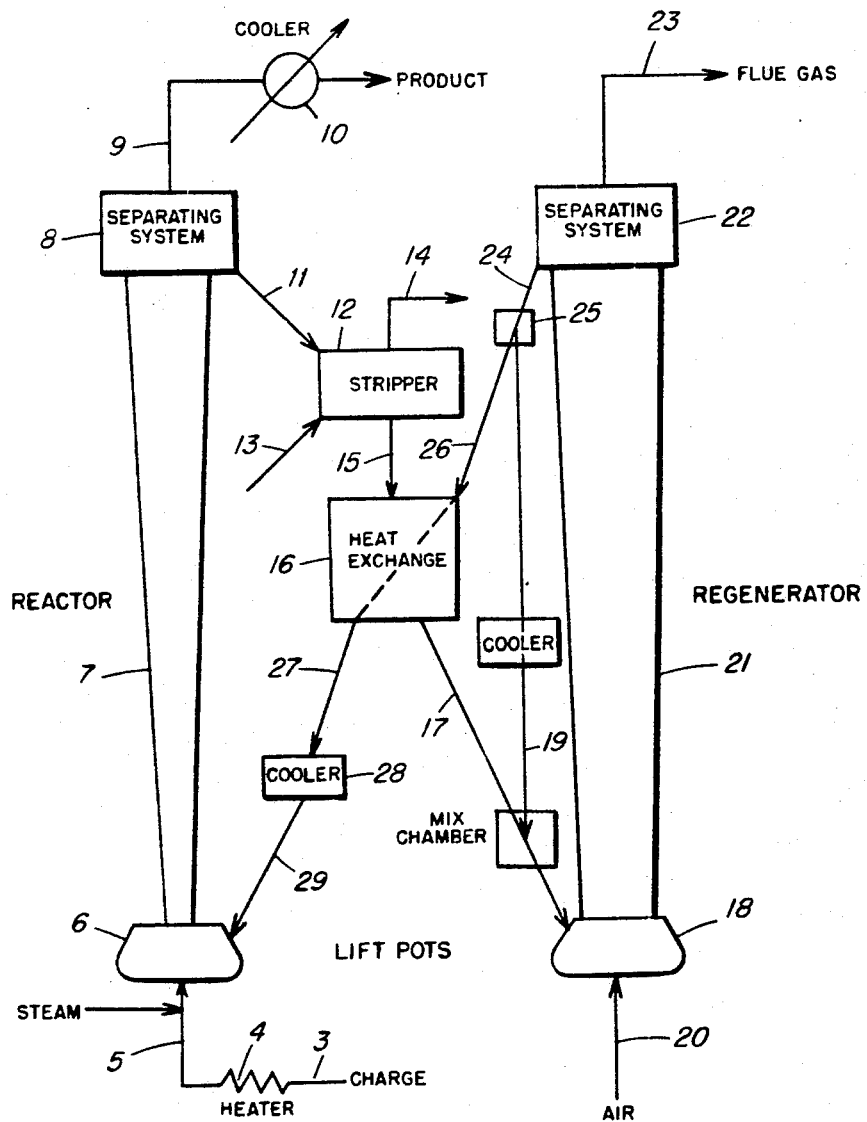
Figure 2:
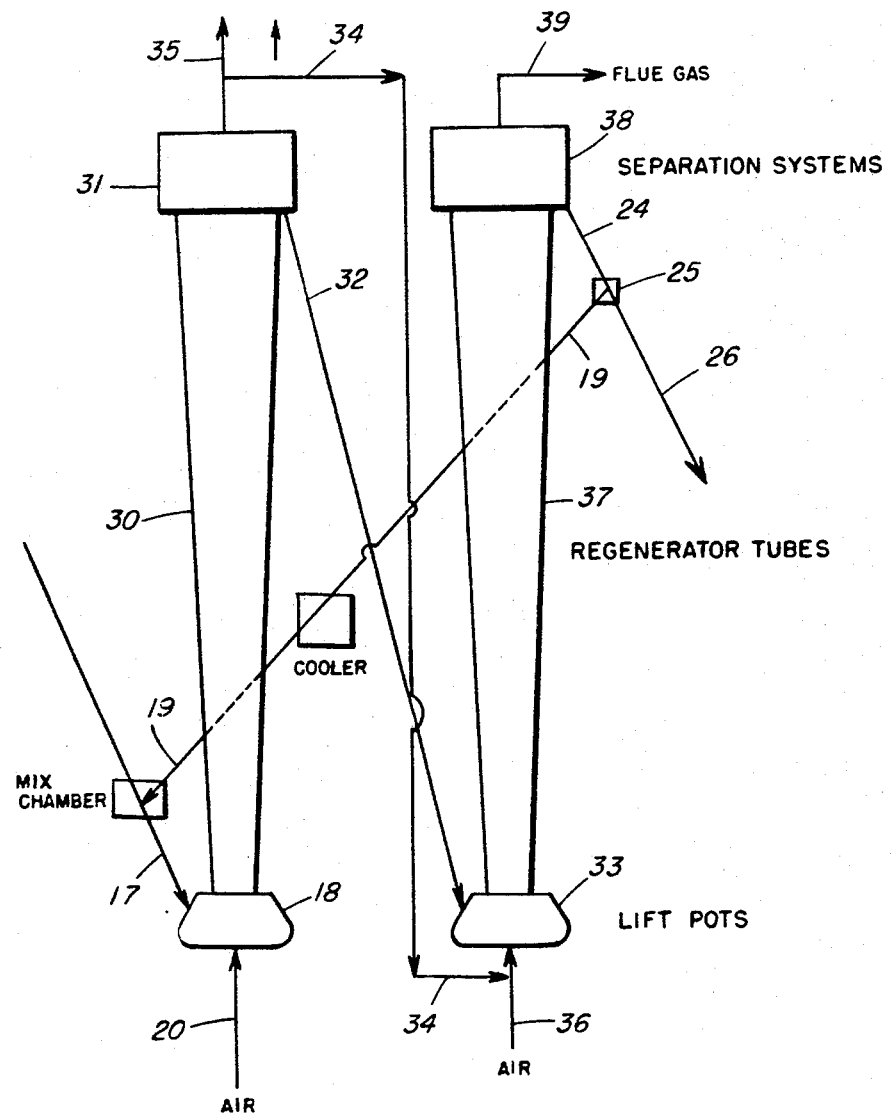

In the drawings, FIGURE 1 is a diagrammatic showing of a cyclic process utilizing reaction and regeneration, and FIGURE 2 is a diagrammatic showing of a variation of the regeneration system.

In this exemplary showing, the active particles are contacted with the reaction fluid while the reaction fluid is being passed through a controlled reaction path of critical length and under critical flow conditions required to transport the catalytic material in the reaction fluid as separate, discrete particles, at essentially the same velocity of transport as the reaction fluid. The path length, temperature, relative amounts of catalyst and hydrocarbon, and residence times of hydrocarbon and catalyst are so selected and adjusted that the desired reaction is completed at the time the materials reach the end of the flow path, after which the catalyst and reaction fluids are separated. If a heat balance solid is needed, it may be introduced to flow with the reactant and highly active catalyst. Such heat balance material may be an inert, or it may be a material of lesser catalytic activity than the highly active catalytic material, or it may be a mixture of inerts and catalysts of lesser activity.

In FIGURE 1 of the drawings, charge hydrocarbon enters at 3, to be heated in heater 4 and discharged through pipe 5 into lift pot 6, to act as a solids-lifting material therein. Lift pot 6 is of conventional type, known to the industry and used for the transport of solids in catalytic cracking systems. Extending upwardly from lift pot 6 is reactor tube 7, utilized for upward transport of solids and a gaseous medium, as it is in known catalyst lift mechanisms, except that now the lifting medium is the hydrocarbon reactant. It will be noted that the lift-reactor 7 is indicated as being tapered. This is merely to indicate that all of the knowledge presently existing as to the proportioning of lifts, the conditions existing therein, and the regulation thereof are applicable, where needed and expedient, to the design and handling of this lift-reactor. At the top of the reactor 7 there is indicated a separating system 8, which will include such stilling chambers, cyclones, and/or other equipment to separate vapors from solids, permitting vapors of products and of unconverted charge to depart through line 9, cooled, if desired, by cooler 10.

Catalytic solids from separating system 8 depart through 11, and may be stripped in stripper 12, by steam admitted at 13. Vaporous material stripped from the solids passes out at 14, and may be disposed of as thought advisable. Frequently it is introduced at some point in the product handling system, to be recovered therein. Stripped solids flow through line 15 into heat exchanger 16, there to be heated by hot regenerated solids, and flow from heat exchanger 16 through line 17 to regenerator lift pot 18, having been mixed therein, or prior to entry thereto with hot, regenerated solids from line 19. The purpose of heat exchanger 16 and regenerated hot solids from line 19 is to raise the temperature of spent solids from reactor 7 to a high temperature before entry to regeneration to insure proper ignition and competent regeneration. The recirculated solid material from line 19 may also act as a heat sink in regeneration and prevent undue rise of temperature.

Stripper 12 need not be a separate vessel and may be combined with heat exchanger 16. Solids-to-solids heat exchanger 16 may be of several types known to the art, one such type being composed of paired passages for hotter and colder solids.

Regenerator lift pot 18 is used to entrain hot spent solids and any recirculated regenerated solids for transport upwardly through a lift passage which serves as a regenerator. Regeneration air enters at 20, and the lift tube 21 of the lift-regenerator is once again a lift of known type, subject to the considerations of design and regulation known to the art for such lifts. At the top of regenerator 21 there is indicated a separation system 22, incorporating such equipment as found necessary for the separation of flue gas to depart through 23 and hot, regenerated solids to pass through line 24. Hot solids in line 24 are divided by appropriate means 25 into the amount of material desired for the reactor to pass through line 26 into heat exchanger 16 and the recycled hot regenerated material passing into line 19. If desired, or necessary, a cooling step may be introduced in line 19. Solids from line 26, passing through heat exchanger 16, go by way of line 27 to a cooler, 28, where, if necessary, their temperature may be adjusted prior to entry to reactor lift pot 6 by way of line 29.

FIGURE 2 shows a double lift regeneration system.

Once again spent solids enter lift pot 18 by way of line 17, and recycled hot regenerated solids come in by way of line 19. In this embodiment, lift-regenerator 30 is of smaller diameter than the single lift tube of FIGURE 1, as later explained. At the top there is again provided a separation system indicated by 31 from which regenerated solids, after a partial regeneration in 30, flow by way of line 32 to the lift pot 33 of a second regenerator lift. Flue gas flowing from 31 are discharged to atmosphere at 35. Some might be passed through line 34 to the second stage of regeneration. Air from line 36 provides the entraining regeneration medium to carry solids up from lift pot 33 and regenerate them in lift tube 37. At the top of regenerator tube 37 there is indicated a solids separation system 38 to separate flue gas for disposal through line 39, and hot solid material for passage through line 24. It will be noted that in FIGURE 2 those items which are functionally the same as in FIGURE 1 bear the same numbers as in the first figure.

In general, the temperature of reaction in such a system will be between about 750° F. and about 1000° F., with a preference for cracking between about 850° F. and 950° F. Regeneration will be conducted so as to have top temperatures not substantially above about 1400° F., with a preference in the case of most highly active materials for top temperatures in the range of from about 1200° F. to about 1300° F. To insure adequate and rapid burning it is preferred to introduce the solids to regeneration at temperatures of the order of 1200° F. Since these highly active materials retain very adequate activity in the presence of residual coke, it is preferred to permit a small controlled amount of coke, ranging from about 0.2 wt. percent to about 1.0 wt. percent (based upon highly active ingredient), to remain upon the catalyst.

As an example of the operation of the system, for the purpose of cracking gas oil, the following may be given.

Hot regenerated solids, which are 50 wt. percent of a highly active catalyst REY, later described, the remainder being a silica alumina composition of low activity, enter from line 24 into lift pot 6 at a temperature in the range of 1000–1050° F. Charge oil, such as a Mid-Continent gas oil, heated, enters through line 5 in admixture with about 5% of its weight of steam. The temperature of the oil, solids, and steam being such as to arrive at a "mix" temperature of about 950° F., which will give an effective average reaction temperature of about 900° F. The ratio of total solids to oil, weight basis, is 2/1, and the ratio of superactive catalytic material to oil, weight basis, is 1/1. The reactor is operated at about 20 p.s.i.g. The entrained catalytic material and solids pass through the reactor lift in about 7.2 seconds, the hydrocarbon materials in slightly less time. The outlet temperature of the reactor is about 878° F.

On the regenerator side, spent solids in line 17 should be brought, by means of heat exchanger 16 and recycled solids from line 19, to a temperature as near 1200° F. as possible, to ensure quick and competent regeneration. Under the conditions of the example, with about three times as much solids recirculated through line 19 as come in through line 17, this temperature will be of the order of 1162° F. Atmospheric air, pressured to 20 p.s.i.g., is introduced at 20 as the entrainment and regeneration agent. Temperature at the exit from regeneration is about 1257° F.

With the conditions and catalyst above described, a conversion of about 65% (vol.), may be gotten.

For a capacity of about 30,000 barrels of oil per stream day, the following approximate dimensions are applicable. For the ninety-seven foot high reactor tube, a diameter of six feet is necessary, and the single pass regenerator of FIGURE 1 will be 7.8 feet in diameter and 105 feet high. The solids circulation to the reactor in line 29 is about 380 tons per hour, the coke content of the spent material going to regeneration is about 1.13% (wt.), the coke burning load of the regenerator is about 6700 pounds per hour, the residence time of the solids in the regenerator is about 11 seconds, and the coke on the regenerated solids passing through line 29 to the reactor is about 0.25 weight percent.

In FIGURE 2, the same general conditions occur, except that the lift-regenerator is now two tubes, of considerably less diameter, about 4 feet, since better control of flow conditions may be had in a lift of lesser diameter, and with it assurance of a more uniform regeneration, this being helped by the two stage introduction of air.

The operation conducted in the above fashion differs from any previously described or conducted operation in that it is specifically designed and carried out to take best advantage of a class of catalytic materials not heretofore utilized in an advantageous manner, as will be evident from the following discussion of such materials.

This invention is concerned with the utilization of superactive catalytic materials. To define superactivity, in terms of gas oil cracking, a superactive catalyst should be able to crack gas oil sufficiently well to give about twice as rapid a rate of cracking at any conversion level as an amorphous silica alumina conventional catalyst when exposed at comparable conditions.

Exemplary of an amorphous silica alumina conventional catalyst is the bead catalyst prepared according to Schwartz, U.S. Patent 2,900,349. Briefly, a solution of sodium silicate containing a controlled amount of fines of specified size from a previous similar preparation is brought into contact with a solution of aluminum sulphate and a small amount of sulphuric acid to form a co-gel which forms into spherical particles in an oil medium. The withdrawn particles are washed free of excess salts, dried at about 350–400° F., and treated with an atmosphere containing about 25% steam, for about 6 hours, at a temperature of about 1300° F.

To compare activities it is appropriate to test the catalysts, in pellet or bead form, in a fixed bed reactor, at a temperature of 900° F., and ascertain the comparative liquid hourly space velocity and time on stream necessary to obtain a desired level of conversion. An example of such a comparative run appears hereinafter.

Exemplary of the superactive catalytic materials with which this invention is concerned are crystalline aluminosilicate materials which have been so treated as to confer upon them the superactivity described. There are other materials of superactivity, but this present discussion will be restricted to the altered crystalline aluminosilicates.

A typical crystalline aluminosilicate may be represented by the formula:

$$M_{2/n}O:Al_2O_3:wSiO_2:yH_2O$$

wherein M is a cation of valence $n$ which balances the electrovalence of the crystalline structure, $w$ is the moles of $SiO_2$, and $y$ the moles of $H_2O$. The cation can be any one or more of a number of metal ions depending upon whether the aluminosilicate is synthesized or occurs naturally. Typical cations include sodium, potassium, calcium, lithium, and the like. Although the proportions of inorganic oxides in the aluminosilicates and their spatial arrangement may vary, effecting distinct properties, the two main characteristics of the aluminosilicate materials are the presence in their molecular structure of at least 0.5 equivalent of an ion of positive valence per gram atom of aluminum, and an ability to undergo dehydration without substantially affecting the $SiO_2$ and $Al_2O_3$ framework.

Typical of such materials are the commercial material known as 13X, the sodium form of which may be represented as:

$$0.9Na_2O:Al_2O_3:2.5SiO_2:6.1H_2O$$

and zeolite Y, the sodium form of which may be represented as:

$$0.9\pm0.2Na_2O:Al_2O_3:wSiO_2:xH_2O$$

wherein $w$ is a value greater than 3, and $x$ may have a value up to about 9. Both have the crystalline form of a faujasite. Other aluminosilicates of similar type, natural and synthetic, exist, and for catalytic conversions of hydrocarbons, those ranging from pore sizes of 5 A. upward to 13 A., or so, capable of accepting the usual spectrum of hydrocarbons in a charge stock, are preferred.

The preparation of superactive catalytic materials from such aluminosilicates is discussed in issued patents, such as Plank et al., U.S. Patent 3,140,249; Plank et al., U.S. Patent 3,140,251; Frilette et al., U.S. Patent 3,140,252; Frilette et al., U.S. Patent 3,140,322; Plank et al., U.S. Patent 3,140,253. Such preparations meet the test of superactivity defined above. Desirable preparations of this type may also be defined as crystalline aluminosilicates having a structure of rigid three dimensional networks characterized by a uniform pore diameter between 5 and 15 Angstrom units with which are associated rare earth cations, ions selected from the group consisting of hydrogen and hydrogen precursors, and mixtures thereof.

With the two faujasite materials mentioned above, it is usual to base exchange the faujasite with an aqueous solution of mixed rare earth chloride hexahydrates until an extensive replacement of the original metal (as sodium above), is accomplished, followed by washing to free the material of chloride ion and dehydrating to convert to the active form. 13X materials so treated, and faujasite Y materials so treated are referred to hereinafter as REX and REY.

It must be pointed out that the materials fresh from the treatment above described are possessed of an activity so great as to be inappropriate for any presently existing process, and that the activity is reduced to a useful level by steaming or calcining. For example a freshly prepared REX, having about 1.0% (wt.) of residual sodium or less, may be steamed for 24 hours at 1200° F., in 100% steam, at 15 p.s.i.g., and provide a superactive catalyst meeting the definition above set forth.

Such materials are most usually prepared for commercial use by dispersing in a matrix material, or by use of a binder, to form a strong and resistant particle of appropriate size for use in the desired process, since the crystallites themselves are quite small in size.

Such a matrix or binder material must be thermally stable under the conditions of reaction in which the catalyst is to be used. Thus, solid porous adsorbents, and supports and carriers of the types, active and inert, heretofore used in catalytic operations may be used with the aluminosilicates. Such materials include, by way of example, dried inorganic gels and gelatinous precipitates of alumina, silica and the like, co-gelled materials such as the silica alumina bead material, and similar preparations. Also various clays, kieselguhr, bauxite, and the like may be used.

If the material used be primarily for a binder, it may well be desired that it be of controlled low activity, so as to not enter into the reaction to any significant extent. Binder materials as above noted, even those of fair initial activity, such as the silica alumina gels, may be substantially reduced in activity by extended steaming or by treatment with water, held as liquid under high pressure, at high temperatures in the so-called hydrothermal treatment. With the superactive aluminosilicates, these treatments may be practised upon the combined binder and aluminosilicate.

If the process contemplates the use, as in the example, of an added solid material utilized primarily as a heat balance material, that material may also be reduced in activity, by means such as those indicated, to minimize its catalytic effect upon the process being practised.

This invention provides a process wherein the capability exists of utilizing the catalytic activity of the superactive catalyst to a substantial extent while minimizing the effect of the activity of a matrix, binder, or heat balance material that may be present and have activity.

To show why this is needful, the following Table I contrasts the product distribution obtained at the 65% conversion level with a rare earth exchanged Y faujasite, REY, and a conventional, competent, amorphous silica alumina bead catalyst material, each being operated at conditions appropriate for 65% conversion.

TABLE I

|  | REY | Conventional Silica Alumina |
|---|---|---|
| Conditions of Operation: |  |  |
| Type | (1) | (1) |
| Temperature, deg. F | 900 | 900 |
| Liquid Hourly Space Velocity | 64 | 2 |
| Duration of Run, seconds | 55 | 500 |
| Conversion (vol. percent) | 65 | 65 |
| Products: |  |  |
| C$_5$+ Gasoline (vol. percent) | 60.0 | 46.5 |
| Total C$_4$s (vol. percent) | 11.5 | 17.5 |
| Dry Gas (wt. percent) | 5.0 | 9.0 |
| Coke (wt. percent) | 1.75 | 4.0 |

1 Fixed bed.

The conventional silica alumina was a commercial product, prepared in accordance with the procedure previously indicated. The REY was prepared by a process later described in detail herein.

From Table I it is clear that in any operation where a material such as silica alumina or any of the many materials of lower or of lowered activity are present as a matrix, binder, or heat balance material it is advisable to avoid, in so far as possible, substantial conversion of the type presented by these materials.

To achieve this purpose, advantage is taken of the widely differing rates of activity of the several materials, and of the differing rates of decline of activity of the materials with time of exposure of the material to the hydrocarbon to be converted.

In developing the data of Table I, and for tables that follow, use was made of the commercial amorphous silica alumina, and of preparations of REX and REY, made according to the following procedures.

For REY, there was first prepared a sodium Y.

SOLUTION A

|  | Pounds |
|---|---|
| Sodium aluminate | 2.65 |
| Sodium hydroxide | 11.63 |
| Water | 47.5 |

SOLUTION B 65.91 lbs. of silica sol (Du Pont Ludox L. S. grade, 30% SiO$_2$).

To the freshly prepared Solution A, while hot and being stirred vigorously, the silica sol was added over a period of 15 seconds. The vigorous mixing was continued for an additional 45 minutes, and the mix was then split into 14 4-liter glass jars, and placed in a constant temperature bath at 200° F. these were held at 200° F. for 44 hours, then the crystallized material was separated from the supernatant liquid by filtration and washing.

Two pounds of the above prepared sodium Y aluminosilicate, as wet cake, was contacted continuously at 180° F. over a 5 day period with a solution of 5 wt. percent RECl$_3$; 6H$_2$O+5 wt. percent NH$_4$Cl at a flow rate of about 30 lbs. of solution per day. The catalyst was then washed essentially free of chloride and dried in air for about 24 hours at 270° F. (A sample analyzed 12.6 wt. percent RE$_2$O$_3$ and 1.07 wt. percent Na.) 5% wt., of stearic acid as a lubricant was added, and the material was pelleted in a tableting machine. The pellets were crushed and screened to pass through 60 mesh, U.S. Standard, and remain on 150 mesh. The stearic acid was burned out at about 1000° F., and the granules of REY were steam treated for 48 hours, 15 p.s.i.g., at 1200° F.

For REX, a rare earth acid faujasite was prepared by continuously base exchanging a sodium X faujasite, for 18 hours at 180° F. with a solution containing 5% wt., RECl$_3$:6H$_2$O and 2% wt., of NH$_4$Cl, then washing. This treatment reduced the Na content to 0.22% wt., and in the process rare earths were introduced into the aluminosilicate to the extent of 26.9% wt., calculated as $RE_2O_3$. This material, after washing was dried for 20 hours at 230° F. and then calcined in air for 10 hours at 1000° F. The dried cake was pelleted, then crushed and screened through 4 and on 10 U.S. Standard mesh. It was then steamed for 24 hours at 1200° F., 15 p.s.i.g.

To illustrate the difference in rates of activity, and in the rates of decline of activity with exposure to reactant, Table II is presented. Table II shows the instantaneous conversion capabilities and gasoline producing capabilities of REX, REY, and the conventional amorphous silica alumina bead catalyst material. All were used in the form of particles small enough to avoid diffusion limitations, and the temperature of reaction was 900° F. The tabulations in each case is the result of a series of conversions so managed as to secure 60% (vol.) conversion, and the results shown are the cubic centimeters of a conventional Mid-Continent gas oil converted, and the cubic centimeters of gasoline produced therefrom during the indicated second (instantaneous, not cumulative), per 100 cubic centimeters of the indicated catalytic material.

TABLE II

| Indicated Second on Stream | Cubic centimeters produced during the indicated second per 100 cubic centimeters of catalyst | | | | | |
|---|---|---|---|---|---|---|
| | REY | | REX | | Si/Al | |
| | Conv. | Gaso. | Conv. | Gaso. | Conv. | Gaso. |
| 1.0 | 13.3 | 10.7 | 45.0 | 26.0 | 1.0 | 0.6 |
| 5.0 | 4.1 | | 10.1 | | .42 | |
| 10.0 | 2.5 | 2.23 | 5.3 | 3.9 | .28 | .17 |
| 60.0 | .7 | | .99 | | .10 | |
| 120.0 | .42 | .41 | .52 | .48 | .07 | .048 |
| 240.0 | .255 | | .27 | | .044 | |

This invention permits taking advantage of the relatively tremendous activity of the superactive catalysts during the earlier portion of their residence time in contact with the reactant, during which period the conversion effected by a commercially competent amorphous silica alumina catalyst is very much less, and more, the product distribution is better.

To take advantage of this, the residence time of the materials, i.e., catalyst and binder, matrix, or heat balance material in contact with hydrocarbons should be less than one minute, preferably less than one-half minute, and most preferably of the order of from about 2 to about 20 seconds.

To illustrate this matter in a different manner, a pair of experiments may be cited. In these experiments, the solid mix was 10 wt. percent of particles of REY and 90 wt. percent of the amorphous silica alumina conventional cracking catalyst. The charge was a wide cut Mid-Continent gas oil. The temperature was about 900° F., and the solid mix was regenerated after conversion. The results follow:

TABLE III

| | (1) | (2) |
|---|---|---|
| Conditions of operation: | | |
| Liquid hourly space velocity | 4 | 64 |
| Temperature, deg. F | 893 | 902 |
| Time on stream | ¹6 | ²12 |
| Yields (corrected to 900° F.): | | |
| Conversion (vol. percent) | 76.0 | 65.8 |
| C₅+gasoline (vol. percent) | 59.7 | 53.9 |
| Total C₄s (vol. percent) | 17.8 | 14.8 |
| Dry gas (vol. percent) | 8.9 | 6.1 |
| Coke (wt. percent) | 4.3 | 5.4 |
| Regeneration: Maximum temperature, deg. F | 1,250 | 1,150 |

¹ Minutes.
² Seconds.

At one sixteenth of the time of exposure of oil to catalyst and one thirtieth of the time of exposure of catalyst to oil, the results in the second column demonstrate the effectiveness of the superactive catalyst at shortened times.

The amount of material of lesser activity was sufficient to hold down the temperature of regeneration, and the maximum temperature of regeneration was such as to permit, in a cyclic operation, the return of adequate heat to the reaction.

To accommodate the indicated durations of reaction, ranging from about 2 seconds to about 20 seconds, a single lift reactor or a series of lift reactors, would range in total height from about 30 feet to about 250 feet.

This invention takes advantage of the new capability to separate the functions of catalyst and heat balance material. With the superactive catalysts, small amounts of catalyst, compared with conventional practise, are needed to get the desired conversions. In present systems for catalytic cracking there are heat demands in the reactor that cannot be taken care of by heating the incoming charge oil without going to temperatures giving serious and undesirable thermal cracking. Such demands are taken care of by the heat of the returning, regenerated, hot catalyst. With conventional catalysts a high reactor heat demand requires a high catalyst/oil ratio, making it difficult to operate with a high activity catalyst.

Now these functions may be separated, and a proper amount of catalyst of proper activity for the desired conversion may be used, with the heat balance function being carried by an appropriate amount of additional material of little catalytic activity.

In the reactor portion of the system, the amount of superactive material required will depend upon its activity, the amount of reaction desired, and in some instances, upon the dimensions of the reactor. The superactive catalytic material will be associated with a binder as heretofore noted, in order to present a particle form material of appropriate size and sufficient physical strength and attrition resistance for use in the process. Bonded materials have been produced using silica alumina gels or silica gels as binding material in which the binder amounts to about 30 wt. percent of the particle. The remainder is the superactive catalytic material. The binder can be reduced in activity as previously described.

In control of the reaction, differentiation must be made between the superactive catalytic material present and the other solid material, be it binder, matrix, or heat balance material present in the total solids fed the reactor. The total solids fed to the reactor is dependent upon the temperature desired within the reactor, the temperature of the incoming reactants (including steam if it be present), and the temperature of the incoming solids. This is solely a matter of heat balance, and may be computed in known manner.

The amount of superactive catalytic material present is dependent upon the reaction desired. Since the control of reaction intensity and the control of heat are now separate, the amount of superactive catalyst to be used may be expressed best in terms of space velocity (weight basis), for the superactive material alone.

As noted previously, the catalyst residence time within the reaction zone should range from about 2 seconds to not over 60 seconds, with preference for residence times not above 30 seconds, the most preferable range of catalyst residence times being from about 2 seconds to about 20 seconds. The space velocity (weight basis), of gas oil charge with respect to the superactive catalytic material will range from about 200 to about 700, with preference for values of from about 400 to about 600.

In the various applications of this invention emphasis is made of the use of discrete particles of at least two different kinds.

Particles of the first kind are composed substantially of the superactive catalytic material, pelleted, or associated with a binder or matrix material, which preferably should be present only to that extent necessary to provide physical stability sufficient for the process contemplated.

The second type of particle may be a catalytic material of activity not greater than that of conventional amorphous silica alumina, preferably lower, or an inert material. Optionally, both catalytic material of low activity and inert material may be present.

As to size, particles of the several kinds should be of about the same size or size range, appropriate to the process contemplated. Sizes are contemplated ranging from the beads, pellets, or granules of about the same size used in fixed bed and moving bed processes, down to discrete particles of the fine sizes utilized in fluidized processes. In many cases, the total solids stream may have a range of sizes of fair width, but still the assortment of particles according to size should be about the same for both the particles composed substantially of superactive catalytic material and particles of the other kind or kinds.

In operations of the exemplary kind described herein, an interesting variable is the size of the particulate solids, both catalytic and of the other kind, or kinds. Generally, it has been felt that while large particles adapt readily to granular flow handling, size might give rise to diffusion limitations and to gaseous transport problems. Small sizes should not be diffusion limited, should lend themselves easily to gaseous transport, but are difficult to handle in granular or gravity flow. Surprisingly, it has been found that a mixture of particles of all sizes from through 60 mesh (U.S. Standard), on the large size, down to include particles retained upon 150 mesh, hereafter spoken of as 60–150 mesh size is unusually well adapted for the purposes of the exemplary operation. Such a mixture, proportioned about as it comes from the crushing operation, unexpectedly combines lack of serious diffusion limitations with flow characteristics of a granular type, shows very little tendency to segregation of sizes in use, either in granular flow or in gaseous transport, and is otherwise more suited for the operation than would be material of a selected narrow size range.

In the exemplary operation shown, the density of the superactive material per cubic foot of reactor space should range from about 0.1 pound to about 1.0 pound per cubic foot, while the density of total solids per cubic foot of reactor volume should range from about 0.2 to about 2.0 pounds.

There is here presented a method of handling the conversion of hydrocarbons in the presence of a superactive catalytic material, and in which there may be present additionally a material of lower catalytic activity, so that the substantial conversion of the type promoted by the superactive catalyst is obtained while conversion of the type promoted by the material of lesser activity is minimized.

There is also presented a method whereby the superactive catalytic material may be utilized in a process in which the variables are adjusted to the proper use of the superactive catalytic material, while the heat demands of the reaction, beyond that supplied by the incoming reactants, are satisfied by the circulation of the superactive catalytic material, plus secondary solid material, of little or lesser catalytic activity, through the reaction and regeneration cycle of a cyclic system.

In a specific form, there is presented a method of accomplishing the above things with a process wherein the catalytic material and associated solids are suspended in a gaseous stream of reactants, with which they flow for a specified time without separation therefrom, the length of that time being sufficient to secure substantial conversion by the superactive material, yet sufficiently short to minimize conversion by material of lesser activity.

Associated therewith is a regeneration method for handling spent catalytic solids from such reaction, which also is based upon the flowing of material to be regenerated in suspension in a gaseous stream of regeneration medium.

While certain specific aspects of the invention have been discussed in terms of specific magnitudes, it is to be understood that the various features of the invention are not to be limited thereto or thereby, but only by such limitations as are expressed in the claims.

I claim:
1. A method for the conversion of hydrocarbons comprising contacting the hydrocarbon with a mixture of at least two different types of discrete solid particles,
   solid particles of a first type being substantially composed of catalytic material possessed of an activity for cracking gas oil which is at least about twice as great as that of conventional amorphous silica alumina cracking catalyst, and
   solid materials of other type being materials having catalytic activity substantially below that of the first type, but having about the same density,
   solid materials of other type being present in an amount such that the total solids entering the reactor from the regenerator are sufficient to supply the reactor heat demand above the heat supply of the incoming fluid reactants,
   the conditions of temperature, space velocity, and time of exposure of solids to hydrocarbons being such as to effect substantial conversion by particles of the first type while effecting less conversion by particles of other type,
   such conditions being:
      temperature between about 750° and about 1000° F.
      weight space velocity of hydrocarbon with respect to particles of the first type from about 200 to about 700
      residence time of solids within the reaction area from about 2 to about 60 seconds, and
      residence time of hydrocarbons and of solids within the reaction area being of about the same value;
   regenerating the mixed solids after reaction, and returning the regenerated solids to reaction.

2. The method of claim 1 in which the reactor temperature is between about 850° and 950° F., the weight space velocity of hydrocarbon with respect to particles of the first named type is from about 300 to about 600, and the residence time of said first named particles within the reaction area is from about 2 to about 30 seconds, and in which the particles of the first named type are crystalline aluminosilicates associated with cations selected from the group consisting of rare earth cations, hydrogen ions, hydrogen precursors and mixtures thereof.

3. The method of claim 1 in which the reactor temperature is between about 750° and about 1000° F., the weight space velocity of hydrocarbon with respect to particles of the first named type is from about 200 to about 700, the residence time of said first named particles within the reaction area is from about 2 to about 60 seconds, and in which the particulate solids are suspended in a rising stream of reactant vapors, to flow therewith at substantially the same speed and without separation therefrom until completion of the reaction.

4. The method of claim 1, in which the particles of the first named type are crystalline aluminosilicates associated with cations selected from the group consisting of rare earth cations, hydrogen ions, hydrogen precursors and mixtures thereof, and in which the reactor temperature is between about 750° and about 1000° F., the weight space velocity of hydrocarbon with respect to particles of the first named type is from about 200 to about 700, the residence time of said first named particles within the reaction area is from about 2 to about 60 seconds, in which the particulate solids are suspended in a rising stream of reactant vapors, to flow therewith at substantially the same speed and without separation therefrom until completion of the reaction, and in which the concentration of particles of the first named type is from about 0.1 to about 1.0 pound per cubic foot of reactor volume.

5. The method of claim 1, in which no solid particles of other than the first named type have a cracking activity substantially greater than that of conventional amorphous silica alumina cracking catalyst.

6. The method of claim 1, in which the particles of the first named type are crystalline aluminosilicates associated with cations selected from the group consisting of rare earth cations, hydrogen ions, hydrogen precursors and mixtures thereof, and in which the solid particles of type other than the first named type are selected from the group consisting of inerts, materials of cracking activity not substantially greater than that of conventional amorphous silica alumina cracking catalyst, and mixtures of the same.

7. The method of claim 1, in which the regeneration is so conducted as to leave a controlled small amount, ranging from about 0.2% to about 1.0% by weight, based upon particles of the first named type, of carbon upon the regenerated solids.

References Cited
UNITED STATES PATENTS

| | | | |
|---|---|---|---|
| 2,361,978 | 11/1944 | Swearingen | 208—120 |
| 2,899,384 | 8/1959 | Swabb et al. | 208—164 |
| 3,198,729 | 8/1965 | Payne | 208—168 |
| 3,255,103 | 6/1966 | Fahnestock | 208—165 |

DELBERT E. GANTZ, *Primary Examiner.*

ABRAHAM RIMENS, *Examiner.*

UNITED STATES PATENT OFFICE
CERTIFICATE OF CORRECTION

Patent No. 3,392,110　　　　　　　　　　　　　　July 9, 1968

John W. Payne

It is certified that error appears in the above identified patent and that said Letters Patent are hereby corrected as shown below:

Column 7, TABLE III, first column, line 9 thereof, "Dry gas (vol. percent)" should read -- Dry gas (wt. percent) --; same TABLE III, third column, line 10 thereof, "5.4" should read -- 3.4 --.

Signed and sealed this 9th day of December 1969.

(SEAL)
Attest:

Edward M. Fletcher, Jr.　　　　　　　　　WILLIAM E. SCHUYLER, JR.
Attesting Officer　　　　　　　　　　　　　　Commissioner of Patents